United States Patent
Lindemann et al.

[11] Patent Number: 6,027,087
[45] Date of Patent: Feb. 22, 2000

[54] RELEASABLY RETAINING TELESCOPING TUBING SEGMENTS

[75] Inventors: Paul T. Lindemann, New Ulm; Thomas K. M. Peterson, Courtland, both of Minn.

[73] Assignee: Stoney Point Products, Inc., New Ulm, Minn.

[21] Appl. No.: 09/074,200

[22] Filed: May 7, 1998

[51] Int. Cl.$^7$ .................................................. F16M 11/26
[52] U.S. Cl. ....................... 248/188.5; 248/412; 248/414
[58] Field of Search .................. 248/188.5, 412, 248/414; 403/109.5, 370, 371

[56] References Cited

U.S. PATENT DOCUMENTS

| | | | |
|---|---|---|---|
| 2,019,753 | 11/1935 | Wittel ................................... | 248/188.5 |
| 2,261,505 | 11/1941 | Schlesinger . | |
| 2,473,351 | 6/1949 | Thompson et al. . | |
| 2,490,369 | 12/1949 | Neuwirth . | |
| 2,508,039 | 5/1950 | Neuwirth . | |
| 2,542,967 | 2/1951 | Waechter .............................. | 248/188.5 |
| 2,842,233 | 7/1958 | Greenleaf ................................. | 403/370 |
| 2,873,129 | 2/1959 | Edmundson ...................... | 248/188.5 X |
| 2,881,018 | 4/1959 | Carlson et al. . | |
| 2,912,202 | 11/1959 | Petrick . | |
| 2,999,706 | 9/1961 | Wilcox ................................... | 403/370 |
| 3,004,743 | 10/1961 | Wenger ............................... | 248/414 X |
| 3,011,810 | 12/1961 | Crowder ......................... | 248/188.5 X |
| 3,083,041 | 3/1963 | Owenmark . | |
| 3,098,669 | 7/1963 | Fortin et al. . | |
| 3,515,418 | 6/1970 | Nielsen, Jr. . | |
| 4,134,703 | 1/1979 | Hinners . | |
| 4,238,164 | 12/1980 | Mazzolla .............................. | 403/109.5 |
| 4,632,597 | 12/1986 | Clausen et al. ...................... | 248/412 X |
| 4,695,021 | 9/1987 | Leinfelder . | |
| 4,706,916 | 11/1987 | Cullmann et al. . | |
| 4,896,687 | 1/1990 | Segal et al. ....................... | 403/109.5 X |
| 5,462,311 | 10/1995 | Cipolla . | |
| 5,876,147 | 3/1999 | Longo .................................. | 403/109.5 |

*Primary Examiner*—Derek J. Berger
*Attorney, Agent, or Firm*—Haugen Law Firm PLLP

[57] ABSTRACT

A telescoping tube assembly of adjustable lengths comprising two or more elongated tubular members with a locking mechanism designed to retain the tubular members and desired relative relationship one to another. The locking mechanism includes a truncated conical expander head with a cylindrical body segment and a conical tip segment, with the expander head functioning cooperatively with a radially expanded frictional break member. A square head (or head of other non-circular configuration), is used to cause relative rotation between the conical expander head and the radially expanding brake member. Annular hinges are provided between the cap portion and the radially expanding friction shoes of the break member, with the integral annular hinges flexing in opposite directions to provide broader area of contact between the internal peripheral of the tubular member and the outer surfaces of the frictional break member.

6 Claims, 6 Drawing Sheets

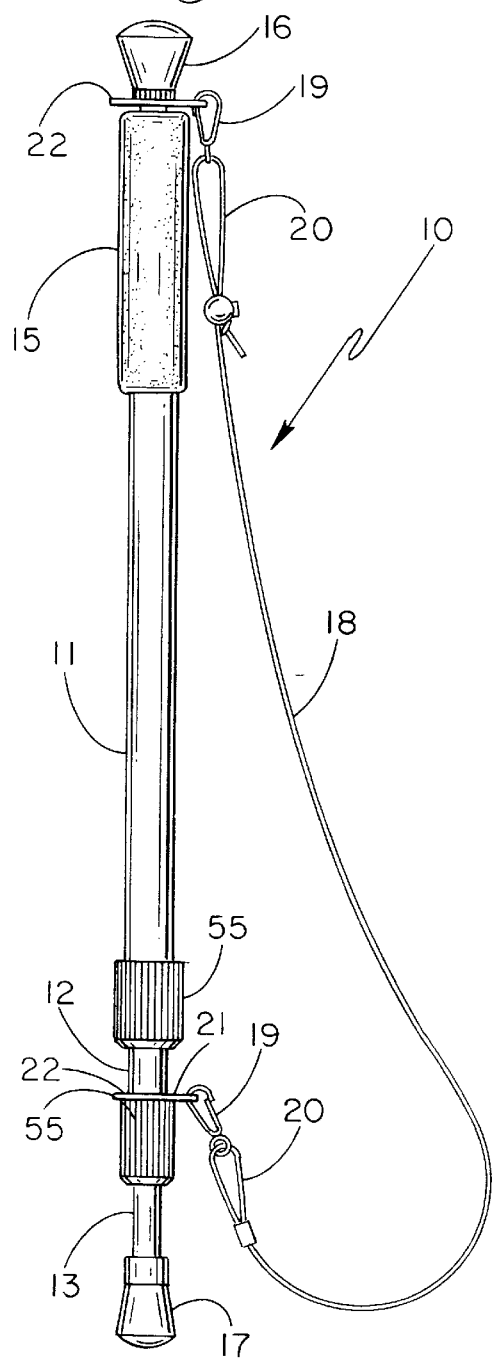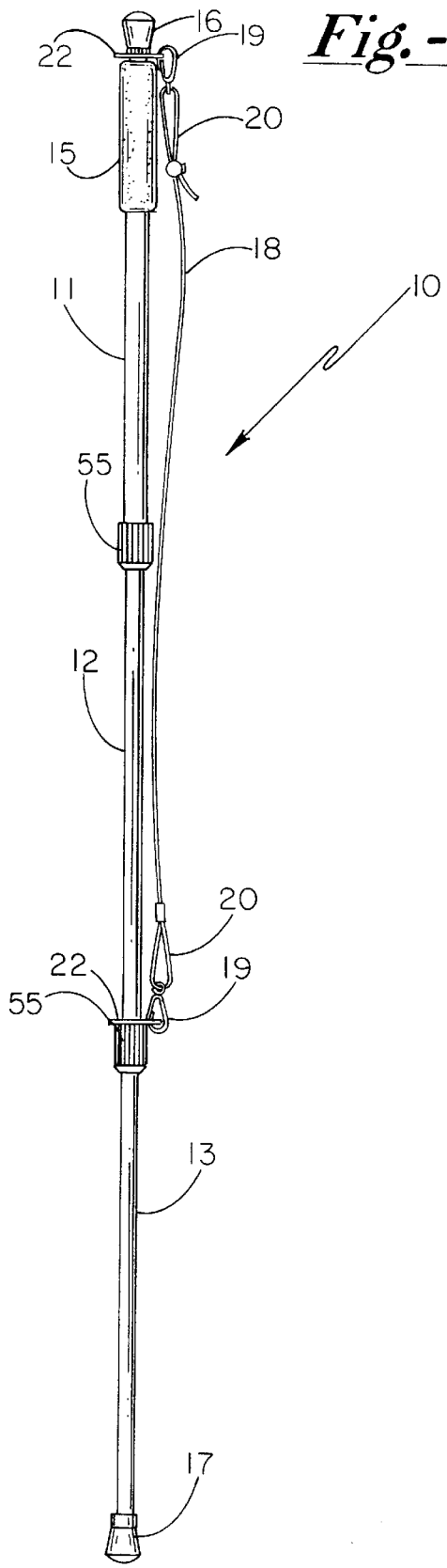

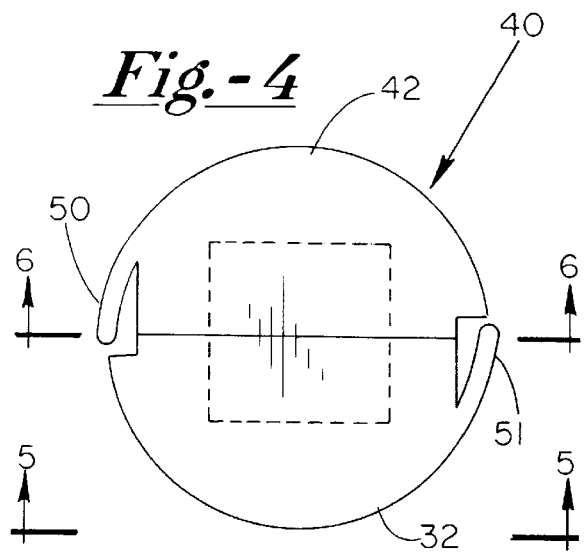
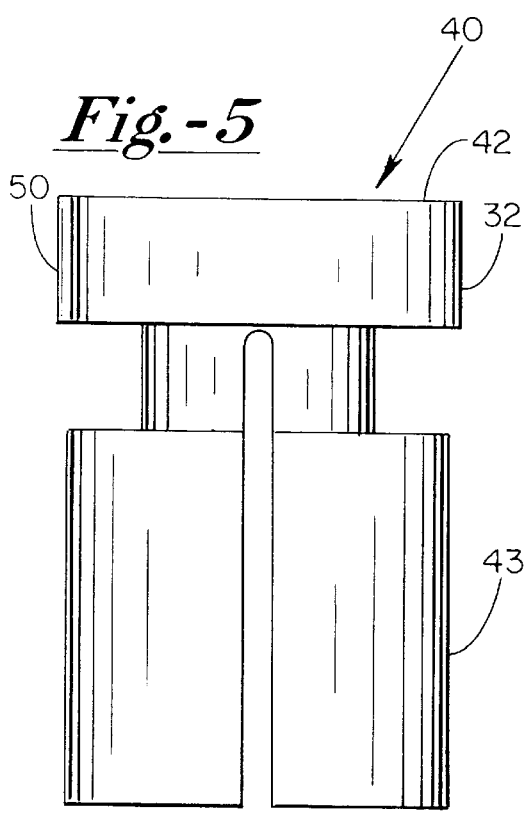
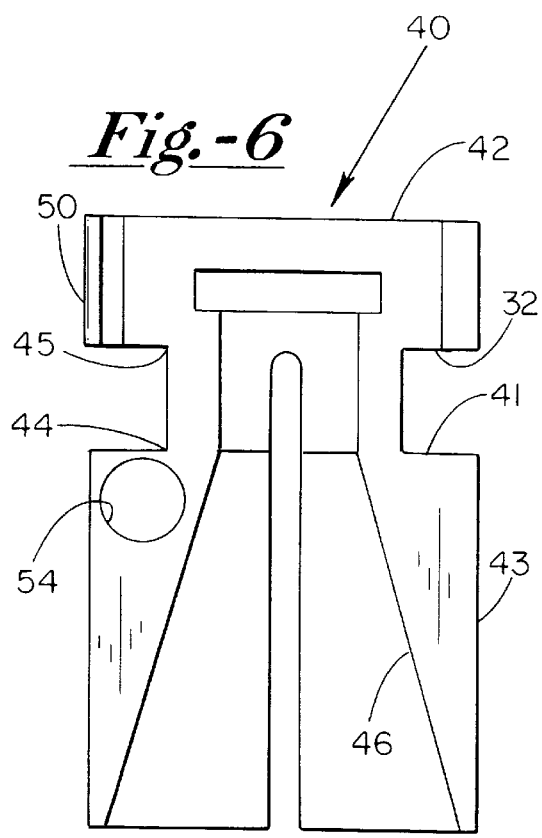

RELEASABLY RETAINING TELESCOPING TUBING SEGMENTS

BACKGROUND OF THE INVENTION

The present invention relates generally to an improved telescoping tube assembly of adjustable length, and more particularly to such an assembly which is light weight and incorporates an improved locking means for releasably restraining and holding telescopically arranged tubular members in a rigid assembly and retained to resist relative axial movement. The locking means of the present invention is rugged, reliable, and its actuation requires only modest arcuate rotation or motion to engage the locking or brake means for locking the telescoping tubular members in any desired adjustable length position.

Telescoping tubular assemblies are used for a substantial variety of applications. Typical applications include use in monopod, bipod and/or tripod assemblies such as are widely used in the sports, recreational, photographic, as well as various industrial applications. Certain of these applications require a locking means which is rugged, durable, and reliable, such as is required in a walking or climbing stick of adjustable length such as used in hiking, mountain or cliff climbing, various load supporting applications, and the like. In order to rapidly deploy the device and render it ready for use, it is desirable that the length adjustment be fixed by requiring initial selection of length followed by only minimal or modest rotational motion for locking. Once the length of the composite tube assembly has been selected and fixed, the application may require that the locking means be capable of withstanding substantial loads without yielding, slipping or collapsing. A further feature of deployment of the present invention is that means are provided to avoid inadvertent disassembly or pull-out of the telescoping members, one from another.

SUMMARY OF THE INVENTION

In accordance with the present invention, a telescoping tube assembly of adjustable length is provided which comprises a plurality of elongated tubular members, and wherein the members have selected interfitting diameters and are arranged to be telescopically received, one within another. The locking means of the present invention is provided for releasably restraining these telescopically arranged members against relative axial telescopic movement. The locking means assembly includes an expander head member of truncated conical configuration and a radially expandable friction shoe which functions through operative engagement with the expander head. Preferably, the expander head comprises a body with a cylindrical shank and conical tip segments, with the expander head being positioned fast within the bore of one of the tubular members. Additionally, the expander head has a coaxially arranged or positioned threaded bore therewithin to receive an actuating bolt. The radially expanding friction shoe comprises a body with a cap portion and a plurality of radially expandable friction shoes of arcuately segmented configuration hingedly connected to and depending therefrom, with friction shoes being joined to the cap portion by the hinge means. Each friction shoe has an inner wall surface converging toward the cap portion, the inner wall being configured to mate with and be substantially complementary to the outer surface of the truncated conical tip segment. The threaded bolt referred to above cooperates with the threaded bore and rotates with the expander head for axial movement to provide radial expansion of the friction shoes due to movement relative to the conical tip segment. As the friction shoes move along the surface of the conical tip segment, they are forced radially outwardly. The hinge means which couple the friction shoes to the cap portion function to cause the friction shoes to move translationally radially outwardly so that there is engagement and/or contact between a substantial portion of the outer surface of the friction shoe and inner periphery of the surrounding telescoping tubular member. It is this arrangement of components which enables the rapid adjustment of the telescoping tubes with the adjustment further providing a rugged, durable and reliable locking means capable of withstanding substantial axial loads without suffering inadvertent collapse or sliding relative motion.

One of the significant advantages to the locking means of the present invention is its ability to alter its configuration from a normal unlocked mode to a fully locked-up mode while requiring only a modest amount of relative rotation of adjacent tubular segments. In other words, the ability to achieve a fully locked-up configuration is achieved through a small or modest amount of axially motion which translates into a firm contact between a broad area of the friction shoes and the surface of the adjacent interior and the internal peripheral surface of the adjacent intertubular surface. This broad area of surface contact is in contrast to that graded increase in surface contact achieved with conventional cone-to-cone braking devices.

Therefore, it is a primary object of the present invention to provide an improved telescoping tube assembly with a locking means for securing adjacent telescoping tubes together. The assembly being rapidly and easily adjusted and locked into position, and wherein the assembly, when locked is rugged, durable and reliable.

It is a further object of the present invention to provide an improved telescoping tube assembly of adjustable length, and wherein locking means are provided which permit the adjustable length to be rapidly fixed with only a modest amount of arcuate rotation being needed to achieve a locking disposition capable of withstanding substantial axial loads.

Other and further objects of the present invention will become apparent to those skilled in the art upon a study of the following specification, appended claims, and accompanying drawings.

IN THE DRAWINGS

FIG. 1A is a side elevational view of a walking and/or climbing stick of adjustable length, and which incorporates the locking means assembly of the present invention for retaining the individual telescoping tubes in proper relationship, one to another with the tubes being shown in collapsed or retracted disposition;

FIG. 1B is a side elevational view similar to FIG. 1A illustrating the tubes in extended disposition;

FIG. 4 is a top plan view of the frictional brake member and illustrating the detail of the cap portion thereof;

FIG. 5 is a side elevational view of the frictional brake member;

FIG. 6 is a vertical sectional view taken along the line and in the direction of the arrows 6—6 of FIG. 4;

DESCRIPTION OF THE PREFERRED EMBODIMENT

Figure 2:
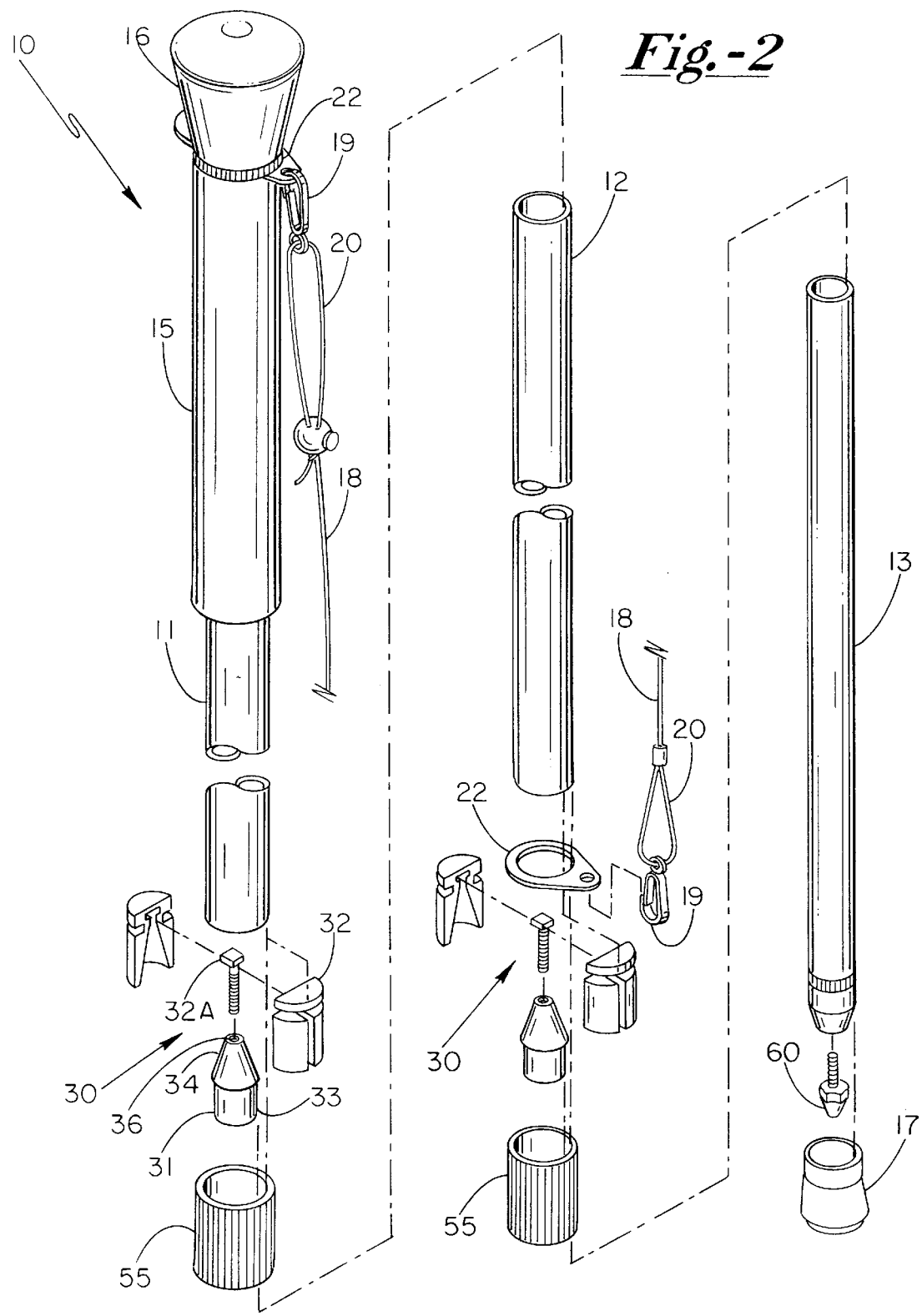
FIG. 2 is an exploded view of the apparatus illustrated in FIG. 1A and B, and showing, in further exploded view, the individual components forming the locking means assembly of the present invention.

In accordance with the preferred embodiment of the present invention and with particular attention being directed to FIGS. 1A and B of the drawings, the telescoping tube assembly generally designated 10 is in the configuration of an adjustable length assembly adapted to function as a walking or support stick. The assembly includes three elongated tubular members 11, 12 and 13, each of which is secured together by locking means discussed hereinafter. The assembly further includes a gripping pad 15, a top cap 16, a tip cap 17, and a carrying lanyard member 18. Lanyard member 18 is secured by means of end clips and/or loops 19-19 and 20-20, and secured to the assembly 10 by slidable annular rings 21 and 22. FIG. 1B is similar to FIG. 1A, which shows the assembly being shown in expanded or extended disposition, and with tubular members 11, 12 and 13 being held in extended locked disposition by the locking means of the invention.

Figure 7:
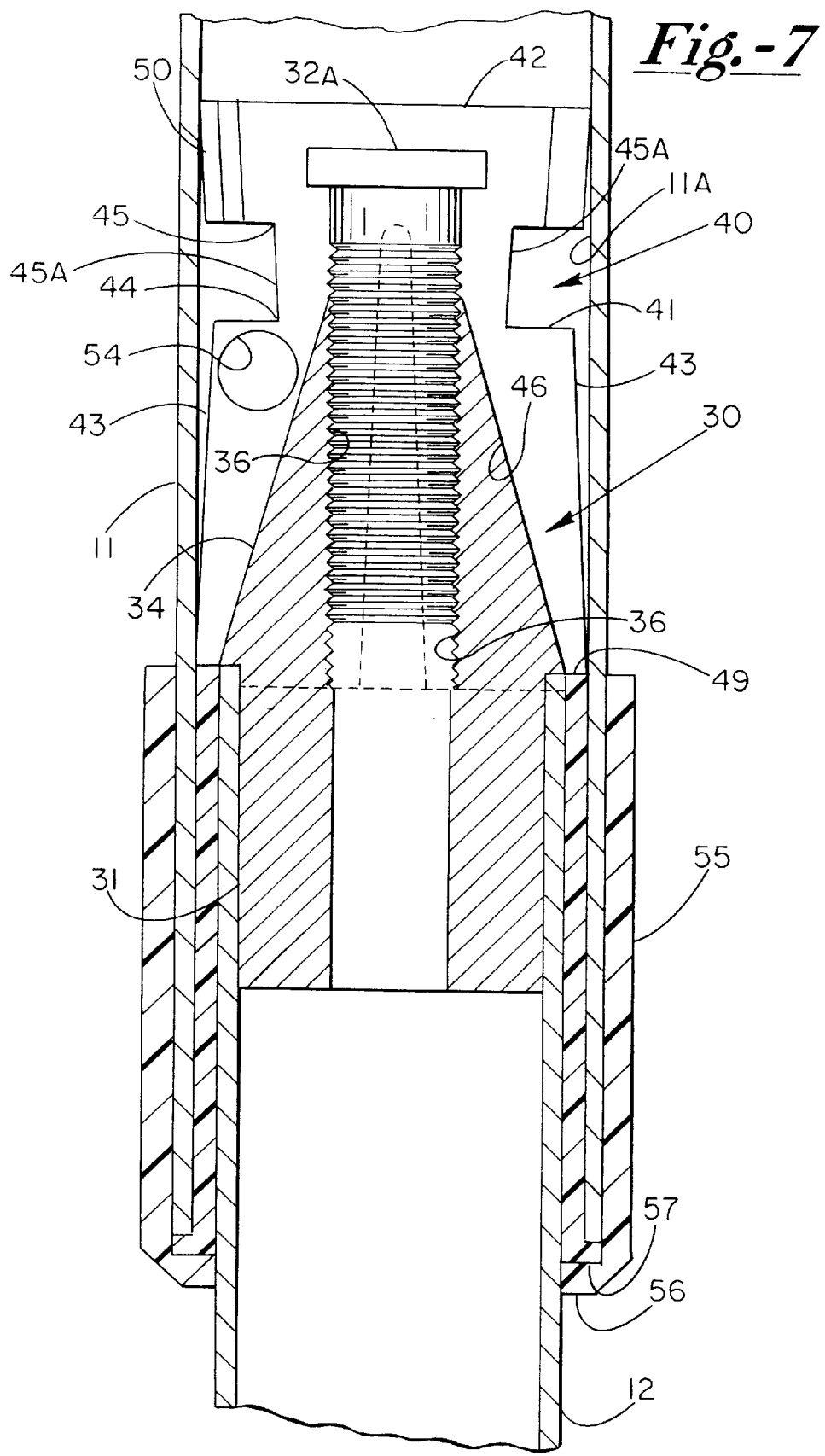
FIG. 7 is a vertical sectional view showing a fragmentary portion of the assembly illustrated in FIG. 1, in order to depict the detail of the locking means of the present invention, and illustrating the radially expanding frictional brake member in unlocked disposition.
Figure 8:
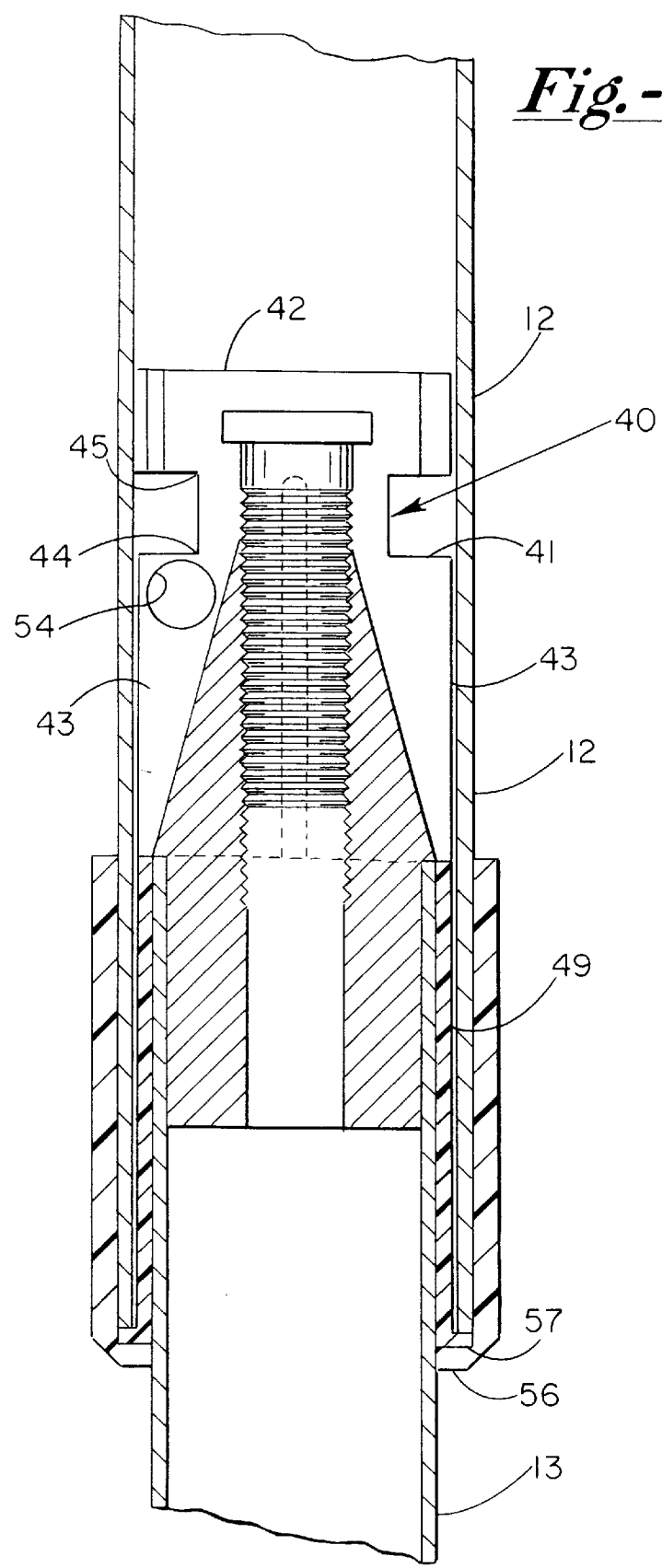
FIG. 8 is a view similar to FIG. 7, and illustrating the radially expanding frictional brake member in locked disposition.

With attention now being directed to FIGS. 2, 7 and 8 of the drawings, the assembly 10, shown in exploded disposition, includes the locking means generally designated 30, which comprises truncated conical expander head 31 and radially expandable frictional brake means 32. In addition, square head bolt or 32A screw is provided. Truncated conical expander head member 31 comprises a body with a cylindrical body segment or portion 33 and a conical tip segment 34. The truncated conical expander head 31 is positioned fast within the receiving bore of tubular member 12. It will be observed that the conical expander head member has a threaded internal bore therein as shown at 36, with bore 36 being concentric with the axis of locking means 30 including expander head 31.

With particular attention now being directed to FIGS. 7 and 8 of the drawings, it will be observed that radially expanding frictional brake member generally designated 40 comprises a body 41 with a cap portion 42 and a plurality of radially expandable friction shoes 43-43 of arcuately segmented configuration. Radially expandable friction shoes depend from and are integral with cap portion 42. In their integral connection to the cap portion, friction shoes are joined to the cap portion through annular hinge means as at 44 and 45, as will be discussed in greater detail hereinafter. Each friction shoe 43-43 has an inner wall surface converging toward the cap portion 42 and configured to mate with and be substantially complementary to the outer surface of the truncated conical tip segment 34 of truncated conical expander head 31.

With attention being directed to FIGS. 7 and 8, a circular chordal bore or aperture may be provided as at 54 in order to receive a rubber sphere to facilitate initial outward flexing of the frictional shoes. As is indicated in FIG. 7, and with the frictional brake member being in its normal and relaxed disposition, the annular hinges are each disposed in right angular relationship, with respect to the body position. When expanded into locking mode, angles 44 and 45 become obtuse and acute respectively, and thereby increase the proportion of contact area between the frictional brake members and the internal periphery of the tubular member such as tubular member 11.

Bolt or screw means as shown at 32A have a threaded shank, which is engaged with the threaded bore 36. The square head of bolt means 32A is designed to cause radially expanding frictional brake member through axial movement of the brake member in response to rotary motion of bolt means 32A. Accordingly, as frictional brake member rotates relative to the expander head, the individual friction shoes are caused to move radially outwardly and forced into contact with the inner wall of the respective confining tubular member in a form of a camming action.

As has been previously indicated, annular hinges 44 and 45 respond to the radial outward movement caused by the camming action of conical tip 34. External ferrule 48, fast upon the outer surface of tubular member 12, is provided in order to force responsive movement of frictional brake member 40. As screw head 33 moves axially toward expander head 31, friction shoes 43-43 are forced outwardly into contact with the inner surface 11A of tubular member 11. In this arrangement, annular hinge 44 flexes to provide an obtuse angle from its normal right angular disposition, while hinge 45 flexes to form an acute angle from its normal right angular configuration. In this arrangement, annular hinges 44 and 45 each provide independent bridge zones, with bridge zone 44A being positioned radially outwardly of the conical portion 34, while bridge zone 45A is disposed axially outwardly from the tip of conical head 34.

With attention now being directed to FIG. 4 of the drawings, it will be observed that cap portion 42 of expander frictional brake member 40 includes drag means as at 50 and 51. Drag means 50 and 51 are in the shape of arcuate ears which frictionally engage the internal peripheral surface of the tubular member with which it is in contact. The availability of the drag means provides a frictional drag which urges and/or causes each radially expanding frictional brake member to rotate with the tubular member with which it is in contact.

In the configuration of FIG. 4, the arcuate camming segments are cut away from the body of the head portion and are normally flexed radially outwardly from the surface of the body of the head portion to contact the inner surface of the elongated tubular member with which it is associated and with which it is in contact. Other forms of drag means may be provided, it be noted that the important feature is that some initial drag or frictional contact be established between the radially expanding frictional brake member and the inner surface of the tubular member.

While the arrangement illustrated in this embodiment includes four frictional brake members of equal arcuate dimension, it will be appreciated that other numbers of frictional brake members may be employed, such as three, five or six.

With continued attention being directed to FIG. 4, it will be noted that the individual drag means 50 and 51 are designed to extend outwardly from the head member and will flex radially outwardly when rotated counter to the direction of rotation in the tightening mode.

In order to facilitate manufacture of frictional brake means 32, the entire body may be created from a pair of plastic molded parts, with each part forming one-half of the overall device, similar to that illustrated in FIG. 2 of the drawings.

With attention again being directed to FIGS. 7 and 8 of the drawings, it will be noted that an external flanged ferrule 55 is provided on the outer peripheral surface of tubular member 11. Flange ferrule 55 has an inwardly directed annular flange as at 56 which is in opposed relationship to annular flange 57 of ferrule 49. In this assembly, ferrules 49 and 55 are fast upon the outer surfaces of tubular members 11 and 12 respectively, and the combination of flange portions 56 and 57 resist over-extension and/or inadvertent disassembly of telescoping tube assembly 10.

Figure 3:
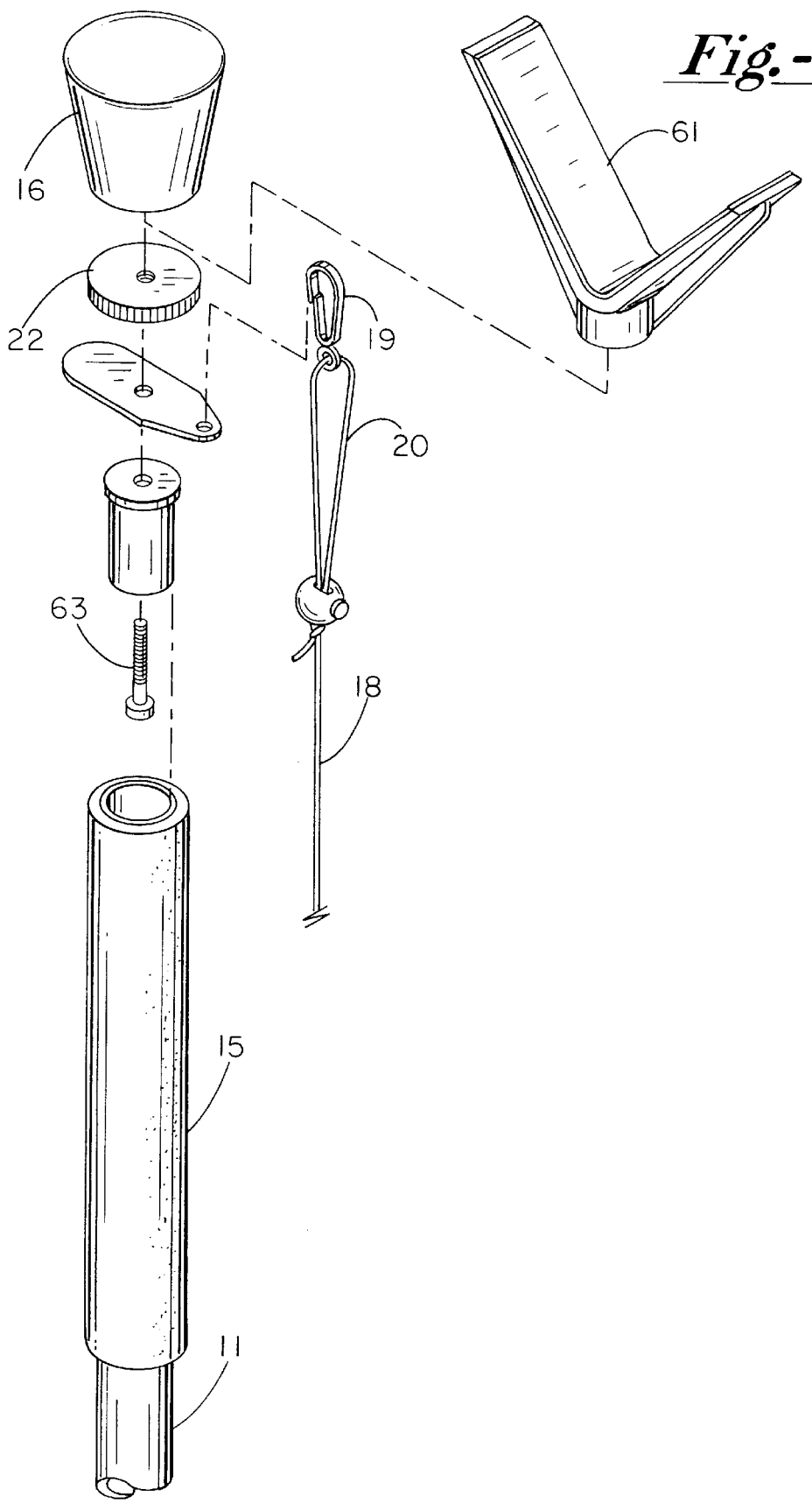
FIG. 3 is a fragmentary exploded view of the upper portion only of the assembly illustrated in FIGS. 1A and B, and showing, in exploded disposition, an upper cap assembly which may be appropriately utilized, and also showing a support cradle which may be coupled to the top of the tubular assembly for use in combination with the device of FIGS. 1A and B.

As an alternative to upper cap 16, and with attention to FIG. 3 of the drawings, a support cradle 61 may be utilized at the upper end of assembly 10. Eccentric cradle may be employed for support of rifles with assembly 10 being utilized as a monopod, or for other applications. A threaded member 62, as illustrated in FIG. 3, may be designed to receive and/or accommodate the amounting nut of a camera, thereby providing appropriate monopod support. It will be obvious that the assembly 10 may be employed in a bipod configuration to function as a cradle support for a riffle, as well as a support for a camera. Tripods have similar applications, including a wider applications where heavier loads are anticipated.

As has been indicated, the adjustable telescoping tube assembly of the present invention finds application in sports activities, recreational products, photographic as well as various industrial applications. As an alternative to tip cap 17, a rigid pointed tip may be employed, particularly for applications such as utilization on ice or similar surfaces. A still further alternative, the device of the apparatus of the present invention may be employed as a ski pole of adjustable length. Such poles find application in cross-country skiing activities where conditions may indicate a change in pole length would be advantageous.

It would be appreciated, of course, that other applications may be found for telescopically coupled tubing assemblies utilizing the improved locking and braking means of the present invention. It would be appreciated, of course, that the specific embodiments disclosed herein are for purposes of illustration only and are not to be construed as a limitation upon the spirit and scope of the present invention.

We claim:

1. In a telescoping tube assembly of adjustable length comprising at least two elongated tubular members, a first one of which has a bore formed therein to telescopically receive the second therewithin, a locking means assembly for releasably restraining said elongated tubular members against relative axial telescoping movement disposed within a receiving bore of the second of said elongated tubular members, said locking means assembly comprising, in combination, an expander head member of truncated conical configuration and a radially expandable frictional brake member in operative engagement with said expander head member; said locking means assembly being characterized in that:

(a) said truncated conical expander head member comprises a body with a cylindrical body segment and a conical tip segment, and wherein said expander head member is positioned fast within the receiving bore of the second of said elongated tubular members, said conical segment having a threaded bore concentric with the axis of said expander head member;

(b) said radially expandable frictional brake member comprising a body with a cap portion with a plurality of radially expandable friction shoes of arcuately segmented configuration depending therefrom, said friction shoes being joined to said cap portion by hinge means and with each said friction shoe having an inner wall surface converging toward said cap portion and configured to mate with and be substantially complementary to the outer surface of the truncated conical tip segment of said expander head member;

(c) bolt means comprising a threaded shank engaged with the threaded bore of said expander head and adapted for rotation relative to said expander head member for axial movement of said friction shoes in engagement with said conical tip segment of said expander head member;

(d) each of said hinge means joining said friction shoes to said cap member including two axially spaced apart bridge zones and with at least one of said bridge zones being normally disposed radially outwardly of the conical portion of said expander head member, and with another of said bridge zones being disposed axially outwardly from the tip of said conical portion, the arrangement being such that said first and second bridge zones flex in oppositely disposed arcuate directions, one to another, so as to force the outer surfaces of said friction shoes against the inner surface of the bore of the second of said elongated tubular members.

2. The combination as defined in claim 1 being particularly characterized in that the cap portion of said expandable frictional brake member includes drag means for frictional engagement between said expandable friction shoes and the inner surface of the second of said elongated tubular members.

3. The combination as defined in claim 2 being particularly characterized in that said drag means comprises arcuate camming segments cut away from the body of said cap portion, and wherein said arcuate camming segments are normally flexed radially outwardly from the surface of the body of the cap portion to contact the inner surface of the second of said elongated tubular members.

4. The combination as defined in claim 1 being particularly characterized in that said axially expanding frictional brake member comprises four radially expandable friction shoes of equal arcuate dimension.

5. The combination as defined in claim 1 being particularly characterized in that annular stop means are provided on said truncated expander head member for resisting axial motion of said conical expander head member in a direction opposed to the direction of rotation of said friction shoes.

6. The combination as defined in claim 1 being particularly characterized in that each of said elongated tubular members is provided with flanged stops for preventing over-extension of the elongated tubular members forming said telescoping tube assembly.

* * * * *